US006859592B2

(12) United States Patent
Seddon et al.

(10) Patent No.: US 6,859,592 B2
(45) Date of Patent: Feb. 22, 2005

(54) OPTICAL FIBER CABLE WITH CONTROLLED HELIX VALUES

(75) Inventors: David A. Seddon, Hickory, NC (US); Michael S. Fedoroff, Saskatoon (SK); William S. Jackman, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/035,769

(22) Filed: Dec. 26, 2001

(65) Prior Publication Data

US 2003/0118299 A1 Jun. 26, 2003

(51) Int. Cl.[7] .................................................. G02B 6/44

(52) U.S. Cl. ........................................ 385/111; 385/109

(58) Field of Search ................................ 385/112, 111, 385/113, 109, 54, 71

(56) References Cited

U.S. PATENT DOCUMENTS 3,912,362 A * 10/1975 Hudson ........................ 385/54
3,912,364 A * 10/1975 Hudson ........................ 385/46
3,917,383 A * 11/1975 Cook et al. .................... 385/54
4,205,900 A 6/1980 Eve ......................... 350/96.31
4,230,395 A * 10/1980 Dean et al. ................. 385/109
4,478,488 A 10/1984 Bagley .................... 350/96.23
5,343,549 A * 8/1994 Nave et al. ................. 385/103
5,440,659 A 8/1995 Bergano et al. ............. 385/100
5,611,016 A 3/1997 Fangmann et al. ......... 385/100
5,675,680 A * 10/1997 Ames et al. .................. 385/54
5,930,431 A * 7/1999 Lail et al. .................... 385/100
5,970,196 A 10/1999 Greveling et al. .......... 385/114
6,005,458 A * 12/1999 Buer et al. .................. 333/248
6,014,487 A 1/2000 Field et al. ................. 385/110
6,550,985 B2 * 4/2003 Nakamura et al. ............ 385/96
6,728,452 B2 * 4/2004 Nishimura .................. 385/100

OTHER PUBLICATIONS

US2001/0028773A1, "Fiber Optic Cable And Optical Transmission System", Oct. 11, 2001.

US2001/0004415A1, "Optical Fiber Transmission Line And Optical Cable Including The Same", Jun. 21, 2001.

US2001/0002943A1, "Multiple Fiber Optical Cable And Method Of Manufacturing The Same", Jun. 7, 2001.

* cited by examiner

*Primary Examiner*—Hae Moon Hyeon
(74) *Attorney, Agent, or Firm*—Timothy J. Aberle

(57) ABSTRACT

A fiber optic cable having optical fibers disposed in buffer tubes, the buffer tubes defining at least two layers generally stranded about a center area of the cable. The buffer tube layers define a relatively inner layer of buffer tubes being closer to the center area, and an outer layer of buffer tubes being relatively further from the center area. The inner and outer buffer tube layers each having a respective helix value, the respective helix values being substantially the same. Alternatively, the respective helix values can be substantially non-equal. In addition, fiber optic cable systems including balanced helix factors have optical connections between layers of buffer tubes of the respective cables.

13 Claims, 2 Drawing Sheets

10 10' 14 15 15' 14' 18 19 19' 18'

OPTICAL FIBER CABLE WITH CONTROLLED HELIX VALUES

Figure 1:
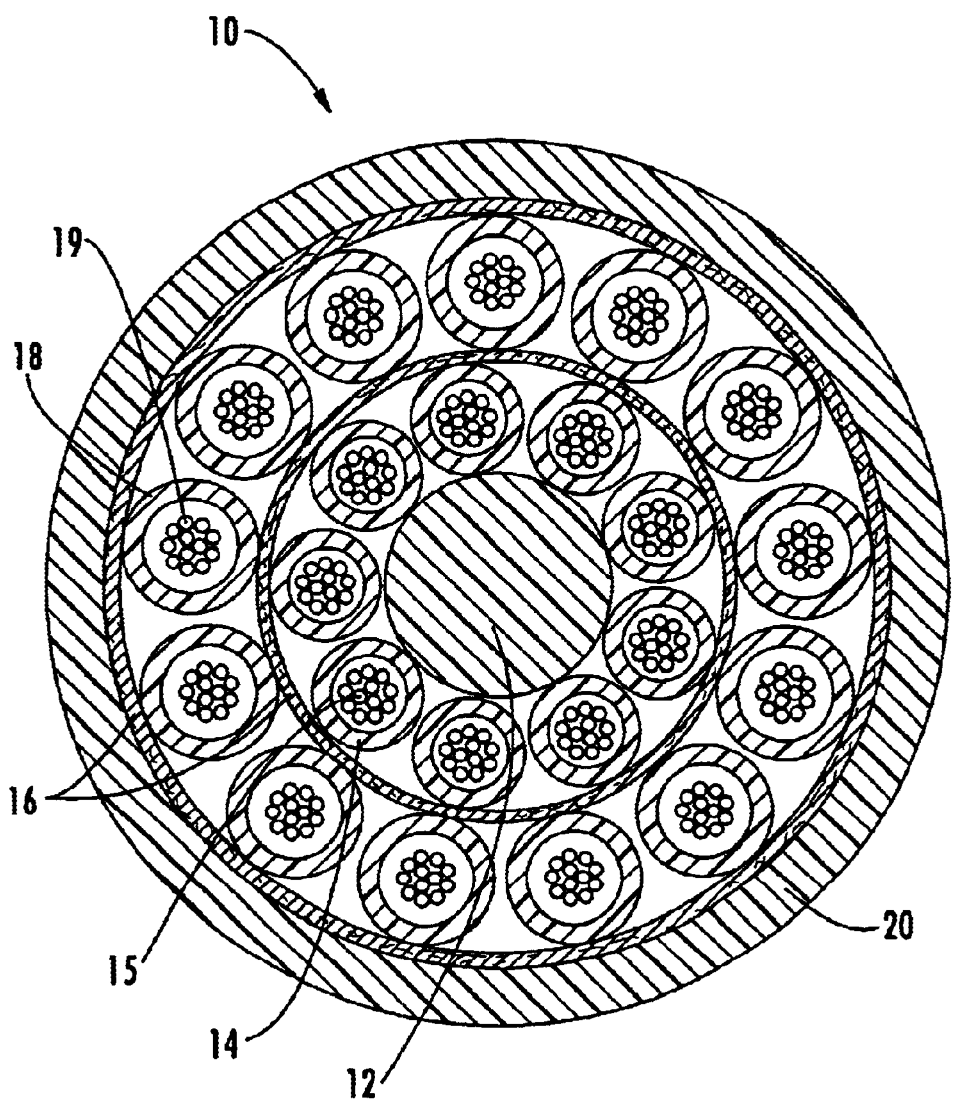

The present invention relates to the field of fiber optic cables, and, more particularly, to fiber optic cables having optical fibers with optical performance characteristics being managed for signal transmission performance of high data rate systems.

BACKGROUND OF THE INVENTION

Fiber optic cables are used to transmit telephone, television, and computer data information in indoor and outdoor environments in non-multiplexed and multiplexed optical transmission systems. In wave division multiplexed systems, optical performance characteristics play a significant role in maintaining high data rate transmission.

Optical attenuation, the loss in transmitted power, and chromatic dispersion, the differential transit time at adjacent wavelengths, are examples of optical performance characteristics in such transmission systems. Optical attenuation is typically due to absorption, scattering, and leakage of light from the waveguide and is customarily measured in a fiber, or cable, as a loss value in dB/km. Chromatic dispersion in fiber optic waveguides can be viewed as the sum of material and waveguide dispersions. Changes in refractive index with wavelength give rise to material dispersion. In bulk glass (silica) fibers, material dispersion increases with wavelength over a wavelength range of about 0.9 $\mu$m to 1.6 $\mu$m. Material dispersion can have a negative or a positive sign depending on the wavelength. Waveguide dispersion results from light traveling in both the core and cladding of an optical fiber. Waveguide dispersion is also a function of wavelength and the refractive index profile. Wavelength and material dispersion affects combine to yield an overall positive or negative chromatic dispersion characteristic at any given point in a given optical fiber. Optical performance concerns regarding pulse spreading caused by chromatic dispersion have created a need for dispersion compensating systems. Dispersion compensating systems employing, for example, positive and negative dispersion compensating fibers, are nevertheless subject to the optical performance constraints associated with optical attenuation.

A fiber optic cable design that acknowledges chromatic dispersion affects is described in U.S. Pat. No. 5,611,016. The patent pertains to a dispersion-balanced optical cable for reducing four-photon mixing in wave division multiplexing systems, the cable being designed to reduce cumulative dispersion to near zero. The dispersion-balanced optical cable requires positive and negative dispersion fibers in the same cable. Further, the positive dispersion aspect includes a dispersion characteristic defined as the average of the absolute magnitudes of the dispersions of the positive dispersion fibers exceeding 0.8 ps/nm.km at a source wavelength. In addition, the negative dispersion fiber characteristic requires the average of the absolute magnitudes of the dispersions of the negative dispersion fibers to exceed 0.8 ps/nm.km at the source wavelength. The aforementioned optical fibers are ribbonized, single-mode fibers designed for the transmission of optical signals in the 1550 nm wavelength region. The fibers are non-stranded or non-helically enclosed within a mono-tube cable, and are described as having an attenuation at 1550 nm of 0.22–0.25 dB/km, and attenuation at 1310 nm of <0.50 dB/km. At defined parameters, the positive-dispersion characteristic is described as being +2.3 ps/nm.km and the negative-dispersion characteristic is described as being −1.6 ps/nm.km.

Other patents describe optical performance characteristics relating to a time division, rather than wave division, system. For example, U.S. Pat. No. 4,478,488 describes selective time compression and time delay of optical signals, without discussing the problems associated with attenuation or chromatic dispersion. A system is described using discrete channels having a dispersive section coupled to a standard multi-waveguide transmission section, and then another dispersive section. Signals are intended to propagate spatially out of phase, which can minimize channel coupling phenomena. An embodiment requires respective plastic coatings formed on twisted optical fibers, the coatings having varying diameters for varying the helix of the fibers in the cable. Individual fibers are spaced from the axis of the twist by different distances. This causes some fibers to twist more than others and extends the length of fiber located at the outside of the bundle compared to one nearer the inside of the bundle. Using a multicore cable made up of cores embedded in a single cladding, each fiber is fixed at a helix that is different than the helix of any other fiber.

ASPECTS OF THE INVENTIONS

A fiber optic cable having optical fibers disposed in buffer tubes, the buffer tubes defining at least two layers generally stranded about the center of the cable. The buffer tube layers define an inner layer of buffer tubes being relatively closer to the center area, and an outer layer of buffer tubes being relatively further from the center area. The inner and outer buffer tube layers each having a respective helix value, the respective helix values being substantially the same. Alternatively, the respective helix values can be substantially non-equal. In addition, fiber optic cable systems including balanced helix factors have optical connections between layers of buffer tubes of the respective cables.

BRIEF DESCRIPTION OF THE DRAWING FIGURE

FIG. 1 is a cross sectional view of an exemplary fiber optic cable according to the present invention.

Figure 2:
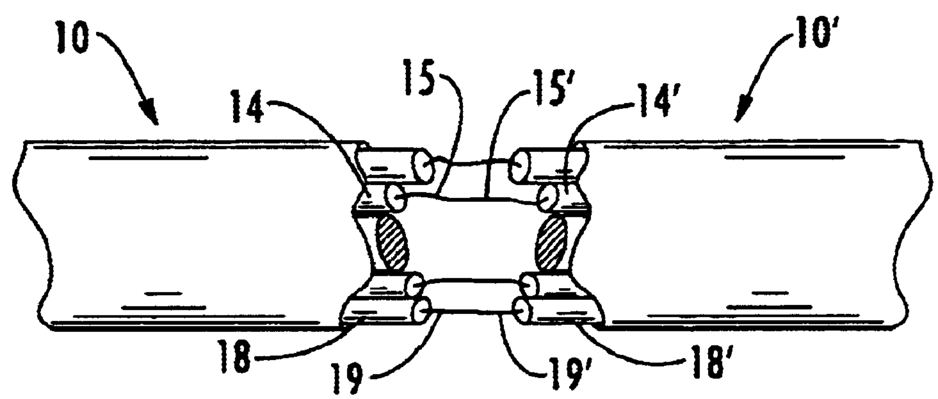
Figure 2A:
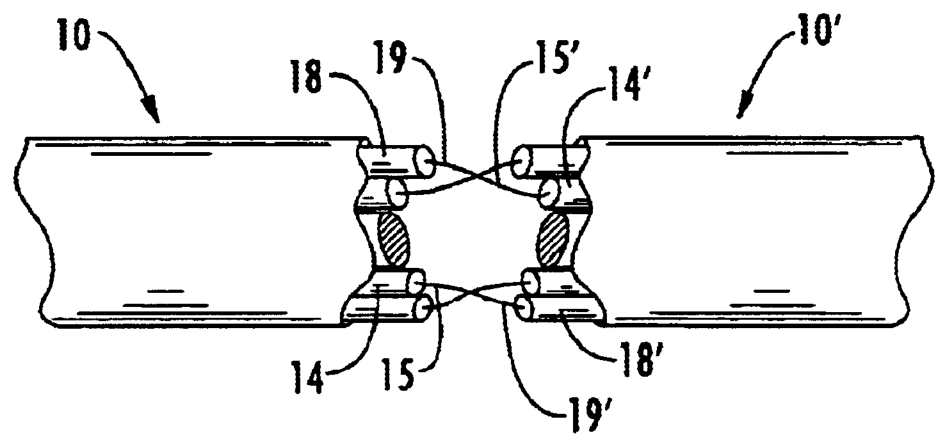

FIGS. 2 and 2*a* are schematic representations of a portion of respective fiber optic cable systems having an optical connection between optical fibers of a first cable and a second cable.

DETAILED DESCRIPTION OF THE INVENTIONS

Referring to FIG. 1, an exemplary fiber optic cable 10 is shown and described for use in an optical transmission system, for example, a dispersion managed cable system (DMCS). Fiber optic cables according to the present invention are of a loose tube construction and can include a single, silica-based optical fiber type or they can define a hybrid design containing at least two different optical fiber types.

For example, the cables can include both positive and negative dispersion compensating fibers (DMCS fibers) or a single type of dispersion managed fiber in combination with non-DMCS fibers, for example, LEAF®, SMF-28, or METROCOR™ fibers made available by Corning Inc. DMCS optical fibers used in cables according to the present invention have predetermined attenuation and chromatic dispersion characteristics such that, in the 1500–1600 nm wavelength regime, the range of absolute values of the chromatic dispersion is between about ten to about forty ps/nm.km. For example, the positive dispersion optical fibers have a dispersion of about ten to thirty ps/nm.km, and the negative dispersion optical fibers have a dispersion of about negative twenty to about negative forty ps/nm.km.

A DMCS fiber is nevertheless subject to optical performance constraints associated with, for example, optical attenuation. The inventors of the present inventions have recognized that optical attenuation and the magnitude of the local chromatic dispersion are both directly proportional to a helix factor. The inventors of the present invention have furthermore discovered a way of managing factors that reduce variations in optical performance, e.g., optical attenuation, in a way that enhances chromatic dispersion management systems. While the magnitude of optical parameters are of major interest in maximizing the reach of a system, the reduction in variation in parameters also allows a greater reach. One factor currently being used to define a digital system quality is the Q factor which is effectively the ratio of the difference between the received “1” and “0” power levels divided by the sum of the standard deviations of the “1” and “0” power levels. An increased Q (good) is associated with more power going through (Low attenuation) and consistencies of the power (low variation) in attenuation and chromatic dispersion. If dispersion is not fully compensated the variation in the “1”s and “0”s increase.

In accordance with the concepts of the present inventions, fiber optic cables having multiple layers of optical fibers, in a loose tube construction, have controlled helix factors and strain windows for controlling optical attenuation and dispersion, enhancing dispersion management and resulting in acceptable Q factors.

Features of the present invention are the minimization of the absolute fiber length in the cable, with control of the relative fiber length between layers in multi-layer optical fiber stranded cables while maintaining desired cable dimensional, thermal, and tensile performance criteria. The present invention achieves a balance of controlling the helix factor, extensile and compressive strain windows, the strength elements in the cable, and the composite thermal expansion characteristics of the cable.

To manufacture multi-layer controlled and minimized helix factor cables cable design parameters are controlled. According to the present inventive concepts, several equations are disclosed. First, the helix factor for each fiber can be determined by the lay length and the pitch diameter of that fiber. Equation 1 shows the relationship between the helix factor, the lay length and the pitch diameter:

$$H_i = \sqrt{1 + \frac{\pi^2 P_i^2}{L_i^2}} - 1 \tag{1}$$

Where $H_i$=the helix factor for fiber i, $P_i$=the pitch diameter for fiber i, and $L_i$=the lay length for fiber i.

The helix factor is commonly expressed as a percent.

The extensile strain window for stranded loose tube cables can be defined as the percent axial elongation the cable can experience before the fibers experience fiber strain. Equation 2 shows a method for estimating the strain window for fibers in a given buffer tube for use in the present inventions.

$$M_{ej} = \sqrt{1 + \frac{\pi^2}{L_j^2}[(D_j + d_j + \Delta_j)^2 - (D_j + 2t_j + b_j)^2]} - 1 \tag{2}$$

Where $M_{ej}$=Extensile strain window, $L_j$=lay length of buffer tube j, $D_j$=the diameter of the core or core components, around which the buffer tube j is stranded, $d_j$=the outer diameter of buffer tube j, $\Delta_j$=the increase in pitch diameter caused by fiber excess length in buffer tube j, $t_j$=the thickness of the tube wall for buffer tube j, and $b_j$=the effective diameter of the fiber or fiber bundle in buffer tube j.

The cable extensile strain window $M_c$ is the minimum Buffer tube extensile strain window and is normally expressed as a percent.

The compressive strain window for stranded loose tube cables is commonly defined as the percent axial compression the cable can withstand before fiber compression occurs. Equation 3 shows a method for estimating the compressive strain window for buffer tube j.

$$M_{cj} = \sqrt{1 + \frac{\pi^2}{L_j^2}[(D_j + d_j + \Delta_j)^2 - (D_j + 2d_j - 2t_j - b_j)^2]} - 1 \tag{3}$$

Where $M_{cj}$ equals the compressive strain window and the rest of the parameters are as defined for Equation 2. The cable compressive strain window $M_c$ is the $M_{cj}$ with the minimum absolute value and is normally expressed as a percent.

The composite thermal coefficient of a cable can be estimated by Equation 4:

$$\alpha_c = \frac{\sum_{i=1 \text{ to } N}^{n} E_i A_i \alpha_i}{\sum_{i=1 \text{ to } N}^{n} E_i A_i} \qquad \text{Equation (4)}$$

Where $\alpha_c$=the composite thermal expansion coefficient, $\alpha_i$=the Thermal Coefficient of expansion for material i, $E_i$=the Young's modulus of material i, $A_i$=the Cross sectional area of material i, and N=the number of materials under stress in the cable.

The allowable temperature limits can be found from Equations 5 and 6.

$$T_{\max} = \frac{(M_e + S_a)}{\alpha} + T_{nom} \tag{5}$$

Where $T_{max}$=maximum temperature for design purposes, $M_c$=cable extensile strain window, $S_a$=allowable fiber strain, $\alpha$=composite thermal coefficient, and $T_{Nom}$=the nominal design temperature for cable characteristic calculations.

$$T_{\min} = \frac{(M_c + C_a)}{\alpha} + T_{Nom} \tag{6}$$

Where $T_{min}$=minimum temperature for design purposes, $M_c$=cable compressive strain window, $C_a$=allowable fiber compression, $\alpha$=composite thermal coefficient, and $T_{Nom}$=the nominal design temperature for cable characteristic calculations.

Strain window is a property of the cable geometry that limits the strain that fibers experience when the cable is stretched, through the application of an external force, or when it contracts or expands in response to thermal affects. Exceeding the strain window can disadvantageously cause optical attenuation and PMD.

In accordance with the present inventive concepts, the respective helix factor values, for respective layers of buffer tubes in the cable, are controlled. The layers of tubes are concentric with respect to a center of the cable, and tubes of a given layer are spaced from the center at about the same distance. For example, the helix value(s) for at least two layers of buffer tubes can be made substantially the same, for example, within about 0 to 2% or 0% to 5% of each other. Other embodiments would include controlled, non-equal helix values for each layer, for example, respective helix values being within about 5–10% or 10–20% of each other.

Fiber optic cable 10 preferably includes at least two layers of buffer tubes 14,18, at least some of the buffer tubes contain bundled optical fibers 15,19 defining a respective bundle diameter. Tubes 14 comprise an inner layer of tubes, and tubes 18 comprise an outer layer. The buffer tubes are formed of materials with known temperature coefficients of expansion/contraction. As noted above, the optical fibers in the tubes can be positive and/or negative, dispersion compensating, and can include non-dispersion shifted fibers, for example, LEAF®, SMF-28 optical fibers, or METROCOR™ fibers made available by Corning Inc. One or more tube positions can be occupied by a filler rod (not shown). Tubes 14,18 are preferably stranded about the center of the cable, which is preferably occupied by a central strength member 12. Water swellable tapes 16 can be disposed adjacent the buffer tubes. A surrounding cable jacket 20 formed of, for example, polyethylene, is extruded over the components.

In preferred embodiments the buffer tube outer diameters (OD) vary from tube layer to tube layer, but the outer diameters will preferably be generally the same within a given layer. Preferably the tube layers having relatively smaller outer tube diameters occupy the inner tube layer. Also, the number of fibers and fiber types in the tubes could be different between layers or tubes within a layer. Preferably, all cable components are made within suitable manufacturing specifications, and are of known or measurable material, mechanical, or geometrical characteristics. For example, the respective moduli of the components are known, each buffer tube is substantially round and has an inner and outer diameter defining a generally constant tube wall thickness, and the buffer tubes are stranded along a defined lay length or pitch. Preferably, helix values are controlled from tube layer to tube layer. In one embodiment, cables made according to the present inventions advantageously have the helix values essentially the same for at least two layers of buffer tubes.

In accordance with the present inventive concepts, the compression margin is different for each layer and is a function of, for example, buffer tube dimensions and lay lengths. The thermal limit for fiber optic cables according to the present inventions is preferably determined by the highest minimum temperature rating between the at least two layers. In other words, the desired strain window is preferably based on a minimum temperature limit.

In a preferred embodiment, cable 10 has a minimum temperature limit of −40° C. and a maximum temperature limit of 70° C. with 8–9 buffer tubes on the inner layer, and 12–13 tubes on the outer layer. The cable meeting these temperature requirements can be made with identical 3.0/2.3 mm (OD/ID) tubes on the inner and outer layer has a minimum helix value of 1.61%. A reduced helix value of 1.45% can be achieved by using a 3.0/2.3 mm tube in the outer layer and a 2.4/1.7 mm tube in the inner layer. An even lower Helix of 0.96% can be achieved by using 3.15/2.9 mm tube in the outer layer and a 2.9/2.2 tube in the inner layer. The foregoing assumes known or measurable material, mechanical, and geometrical characteristics for use in the foregoing equations. Other constraints on the cable design, such as maximum allowed diameters and weights tonically provide the limiting factor for the cables to be used in a particular system.

Buffer tube geometries are illustrative. A preferred tube outer diameter range is about 1.5 mm to about 8.0 mm with a lay length range of about 60 mm to about 600 mm. In general, the tubes of the inner layer have a different outside diameter and inside diameter than buffer tubes in the at least one other layer. In one example, the inner layer has 2.5/1.8 mm tubes and the outer layer has 3.0/2.3 mm tubes, all with 12 fibers. This enables a lay length such that the cable has a controlled helix value, e.g., essentially the same helix value (percentage) in both layers, and meets both the thermal and tensile rating requirements. This also enables the overall diameter of the cable to be minimized for a given fiber count having at least two layers and essentially balanced helix values.

Fiber optic cables according the present invention can be optically interconnected by, for example, fusion splicing, defining a cable system. In one system embodiment, concatenated cables have minimum variation in fiber length without the need to do cross splicing between inner and outer layers of buffer tubes of the respective cables, thereby minimizing differential fiber length (FIG. 2). Layers of buffer tubes having like helix values have at least some of their respective optical fibers optically interconnected. In other words, the fiber optic cable system has first 10 and second 10' fiber optic cables, each of the first 10 and second 10' fiber optic cables having respective optical fibers 15, 15', 19, 19' that arm disposed in respective buffer tubes 14, 14', 18, 18'. The buffer tubes defining at least two layers respectively in the cables, and are generally stranded about center areas of the respective fiber optic cables. The buffer tube layers define a relatively inner layer of buffer tubes closer to the center area, and an outer layer of buffer tubes being relatively further from the center area. The inner and outer buffer tube layers each define a respective helix value, the respective helix values within each cable can be substantially the same; and the layer of buffer tubea having optical fibers of the first optical fiber cable is optically connected to a corresponding layer of buffer tubes having optical fibers of the second fiber optic cable, e.g., by fusion splicing. For example, optical fibers 15 of inner layer 14 can be optically connected to optical fibers 15' of inner layer 14' from cable 10 to cable 10'.

Other balanced cable systems are possible as well. For example, where the respective helix values within each of the cables are substantially non-equal, and the layer of buffer tubes having optical fibers of the first optical fiber cable 10 are optically connected to a non-corresponding layer of buffer tubes having optical fibers of the second fiber optic cable 10' (FIG. 2*a*). For example, an outer layer of buffer tubes 18 of a first cable 10 can be connected to an inner layer of buffer tubes 14' of a second cable 10', and vice versa. The respective helix values are established to as needed for the system requirements. Helix values of the interconnected layers can be substantially the same or non-equal.

The cables and/or systems of the present invention can be used as space diversity backup system, for example, where one fiber optic cable is used as a backup for two other fiber optic cables with differing helix values in the same system. To minimize the differences in back up fiber length from the main system fibers, the helix value in each layer of a fiber optic cable according to the present invention can be made to correspond to the helix values in the cables being backed up.

The present invention has thus been described with reference to the foregoing embodiments, and are intended to be illustrative of the inventive concepts rather than limiting. Persons of skill in the art will appreciate that variations and modifications of the foregoing embodiments may be made without departing from the scope of the appended claims. In the exemplary embodiment described, the fiber optic cable can include ripcords 28, tapes, water-blocking components, armor, anti-buckling members, buffer tube filling compounds, core binders, and/or other cable components disclosed in U.S. Pat. Nos. 5,930,431, 5,970,196, or U.S. Pat. No. 6,014,487, which are respectively incorporated by reference herein.

Accordingly, what is claimed is:

1. A fiber optic cable, comprising:

optical fibers disposed in buffer tubes, said buffer tubes defining at least two layers generally stranded about a center area of the cable; said buffer tube layers defining a relatively inner layer of buffer tubes being closer to said center area, and an outer layer of buffer tubes being relatively further from said center layer, said inner and outer buffer tube layers each comprising a respective helix factor value, said respective helix factor values being substantially the same.

2. The fiber optic cable of claim 1, differing buffer tube diameters with the same wall thickness and lay length being used in each layer to provide the minimum helix factor value for each layer, the helix factor value being within about 0% to about 5% of each other.

3. The fiber optic cable of claim 1, said buffer tubes having inner or outer diameters that vary from tube layer to tube layer.

4. The fiber optic cable of claim 1, one of said buffer tube layers having a relatively smaller buffer tube wall thicknesses or the inner tube layer having buffer tubes with a relatively smaller outer diameter.

5. A fiber optic cable system, comprising:

first and second fiber optic cables, each of said first and second fiber optic cables having respective optical fibers disposed in buffer tubes, said butter tubes defining at least two layers respectively in said cables generally stranded about a center area of the respective fiber optic cables; said buffer tube layers defining a relatively inner layer of buffer tubes being closer to said center area, and an outer layer of buffer tubes being relatively further from said center area, said inner and outer buffer tube layers each comprising a respective helix factor value, said respective helix factor values within each said cable being substantially the same; and the optical fibers of the layer of buffer tubes of said first optical fiber cable being optically connected to the optical fibers of a corresponding layer of buffer tubes of said second fiber optic cable.

6. The fiber optic cable system of claim 5, at least some of said optically interconnected optical fibers having essentially the same overall fiber length through said cables.

7. A fiber optic cable, comprising:

optical fibers disposed in buffer tubes, said buffer tubes defining at least two layers generally stranded about a center area of the cable; said buffer tube layers defining a relatively inner layer of buffer tubes being closer to said center area, and an outer layer of buffer tubes being relatively further from said center area, said inner and outer buffer tube layers each comprising a respective helix factor value, said respective helix factor values being substantially non-equal.

8. The fiber optic cable of claim 7, said buffer tube having inner or outer diameters that vary from tube layer to tube layer.

9. The fiber optic cable of claim 7, one of said buffer tubs layers having a relatively smaller buffer tube wall thicknesses or the inner tube layer having buffer tubes with a relatively smaller outer diameter.

10. A fiber optic cable system, comprising:

first and second fiber optic cables, each of said first and second fiber optic cables having respective optical fibers disposed in buffer tubes, said buffer tubes defining at least two layers respectively in said cables generally stranded about center areas of the respective fiber optic cables; said buffer tube layers defining a relatively inner layer of buffer tubes being closer to said center area, and an outer layer of buffer tubes being relatively further from said center area, said inner and outer buffer tube layers each comprising a respective helix factor value, said respective helix factor values within said first fiber optic cable being substantially non-equal; and the respective helix factor values in said second fiber optic cable having the respective helix factor values such that at least some of the optical fibers in the overall fiber optic cable system have concatenated fiber lengths being essentially equal, when the optical fibers of the layers of buffer tubes of said first optical fiber cable are optically interconnected to the optical fibers of a corresponding layer of buffer tubes of said second fiber optic cable.

11. A fiber optic cable system with some or all fibers having essentially the same length, comprising:

first and second fiber optic cables, each of said first and second fiber optic cables having respective optical fibers disposed in buffer tubes, said buffer tubes defining at least two layers respectively in said cables generally stranded about a center area of the respective fiber optic cables; said buffer tube layers defining a relatively inner layer of buffer tubes being closer to said center area, and an outer layer of buffer tubes being relatively further from said center area, said inner and outer buffer tube layers each comprising a respective helix factor value, said respective helix factor values within each said cable being substantially non-equal; and the optical fibers of the layer of buffer tubes of said first optical fiber cable being optically connected to the optical fibers of a non-corresponding layer of buffer tubes of said second fiber optic cable.

12. A fiber optic cable system, comprising:

first and second fiber optic cables, each of said first and second fiber optic cables having respective optical fibers disposed in buffer tubes, said buffer tubes defining at least two layers respectively in said cables generally stranded about a center area of the respective fiber optic cables, said buffer tube layers defining a relatively inner layer of buffer tubes being closer to said center area, and an outer layer of buffer tubes being relatively further from said center area, said inner and outer buffer tube layers each comprising a respective helix factor value, said respective helix factor values within each said cable being substantially the same; and the optical fibers of the inner layer of buffer tubes of said first optical fiber cable being optically connected to the optical fibers of a outer layer of buffer tubes of said second fiber optic cable.

13. The fiber optic cable system of claim 12, at least some of said optically interconnected optical fibers having essentially the same overall fiber length through said cables.

* * * * *